(12) United States Patent
Bookbinder et al.

(10) Patent No.: US 11,649,188 B2
(45) Date of Patent: May 16, 2023

(54) COATED COVER SUBSTRATES AND ELECTRONIC DEVICES INCLUDING THE SAME

(71) Applicant: Corning Incorporated, Corning, NY (US)

(72) Inventors: Dana Craig Bookbinder, Corning, NY (US); Timothy Michael Gross, Corning, NY (US)

(73) Assignee: Corning Incorporated, Corning, NY (US)

( * ) Notice: Subject to any disclaimer, the term of this patent is extended or adjusted under 35 U.S.C. 154(b) by 504 days.

(21) Appl. No.: 16/639,957

(22) PCT Filed: Aug. 20, 2018

(86) PCT No.: PCT/US2018/047037
§ 371 (c)(1),
(2) Date: Feb. 18, 2020

(87) PCT Pub. No.: WO2019/036702
PCT Pub. Date: Feb. 21, 2019

(65) Prior Publication Data
US 2020/0189970 A1 Jun. 18, 2020

Related U.S. Application Data

(60) Provisional application No. 62/547,294, filed on Aug. 18, 2017.

(51) Int. Cl.
*G02B 1/14* (2015.01)
*C03C 17/22* (2006.01)
(Continued)

(52) U.S. Cl.
CPC ............ *C03C 17/225* (2013.01); *C03C 17/23* (2013.01); *C03C 17/42* (2013.01); *G02B 1/14* (2015.01);
(Continued)

(58) Field of Classification Search
CPC ........ G02B 1/14; G02B 1/18; H04N 5/22521; H04N 9/3176; G06F 1/1626;
(Continued)

(56) References Cited

U.S. PATENT DOCUMENTS

| 6,120,908 A | 9/2000 | Papanu et al. |
| 8,312,739 B2 | 11/2012 | Lee et al. |

(Continued)

FOREIGN PATENT DOCUMENTS

| CN | 1821927 A | 8/2006 |
| CN | 201373962 Y | 12/2009 |

(Continued)

OTHER PUBLICATIONS

Chinese Patent Application No. 201880053582.6, Office Action dated Apr. 6, 2021, 11 pages (5 pages of English Translation and 6 pages of Original Document), Chinese Patent Office.

(Continued)

*Primary Examiner* — Britt D Hanley
*Assistant Examiner* — Hana S Featherly
(74) *Attorney, Agent, or Firm* — William J. Tucker (57) ABSTRACT

In one or more embodiments disclosed herein, an electronic device may include a display device operable to project an image, a front cover substrate positioned over the display device and including a transparent material, and a protective coating disposed on at least a portion of the non-display area of the front cover substrate. The front cover substrate may include a display area over the display device and a non-display area around at least the perimeter of the front cover
(Continued)

substrate. The protective coating may include an inorganic material. The protective coating may not be positioned over the display area.

14 Claims, 8 Drawing Sheets

(51) Int. Cl.

| | | |
|---|---|---|
| C03C 17/23 | (2006.01) | |
| C03C 17/42 | (2006.01) | |
| G06F 1/16 | (2006.01) | |
| H04M 1/18 | (2006.01) | |
| H04N 9/31 | (2006.01) | |
| G02B 1/18 | (2015.01) | |
| H04N 23/52 | (2023.01) | |

(52) U.S. Cl.
CPC ............ *G02B 1/18* (2015.01); *G06F 1/1626* (2013.01); *G06F 1/1656* (2013.01); *H04M 1/185* (2013.01); *H04N 9/3176* (2013.01); *H04N 23/52* (2023.01); *C03C 2217/21* (2013.01); *C03C 2217/281* (2013.01); *C03C 2217/78* (2013.01); *H04M 2201/38* (2013.01); *H04M 2250/54* (2013.01)

(58) Field of Classification Search
CPC . G06F 1/1656; H04M 1/185; H04M 2201/38; H04M 2250/54; C03C 17/225; C03C 17/23; C03C 17/42; C03C 2217/21; C03C 2217/281; C03C 2217/78
USPC .................................................. 362/296.03
See application file for complete search history.

(56) References Cited

U.S. PATENT DOCUMENTS

| | | |
|---|---|---|
| 8,561,429 B2 | 10/2013 | Allan et al. |
| 2003/0157344 A1 | 8/2003 | Shoup et al. |
| 2004/0028906 A1 | 2/2004 | Anderson et al. |
| 2011/0019351 A1 | 1/2011 | Bayne et al. |
| 2012/0027399 A1 | 2/2012 | Yeates |
| 2014/0113083 A1 | 4/2014 | Lee et al. |
| 2014/0242291 A1 | 8/2014 | Joos et al. |
| 2015/0167193 A1* | 6/2015 | Demers .................. C25D 11/16 156/151 |
| 2016/0095241 A1* | 3/2016 | Probst ................. H04M 1/0266 156/60 |

FOREIGN PATENT DOCUMENTS

| | | |
|---|---|---|
| CN | 202563390 U | 11/2012 |
| CN | 104321290 A | 1/2015 |
| CN | 204216954 U | 3/2015 |
| CN | 105392748 A | 3/2016 |
| CN | 105874356 A | 8/2016 |
| TW | 200719000 A | 5/2007 |
| WO | 2012108384 A1 | 8/2012 |

OTHER PUBLICATIONS

Fischer-Cripps; Critical Review of Analysis and Interpretation of Nanoindentation Test Data; Surface & Coatings Technology; 200, 4153-4165 2006.
Hay Continuous Stiffness Measurement During Instrumented Indentation Testing; Experimental Techniques; 34 (3) pp. 86-94 (2010).
International Search Report and Written Opinion of the International Searching Authority; PCT/US2018/047037; dated Nov. 6, 2018; 14 Pages; European Patent Office.
Shackelford; "Introduction to Materials Science for Engineers"; Sixth Edition, Pearson Prentice Hall, New Jersey, 2005 pp. 404-418.
Smart and Moore; "Solid State Chemistry, an Introduction"; Chapman & Hall University and Professional Division, London, 1992 pp. 136-151.
Chinese Patent Application No. 201880053582.6, Office Action dated Nov. 29, 2021, 14 pages English Translation Only, Chinese Patent Office.

* cited by examiner

COATED COVER SUBSTRATES AND ELECTRONIC DEVICES INCLUDING THE SAME

CROSS-REFERENCE TO RELATED APPLICATIONS

This application claims the benefit of priority under 35 U.S.C. § 371 to International Patent Application No. PCT/US2018/047037, filed Aug. 20, 2018, which claims the benefit of priority under 35 U.S.C. § 119 of U.S. Provisional Application Ser. No. 62/547,294, filed on Aug. 18, 2017, the contents of both of which are relied upon and incorporated herein by reference in their entirety.

BACKGROUND

Field

This disclosure relates to coated articles and methods for making the same and, more particularly, to coated articles which may be incorporated into electronic devices for enhanced protection.

Technical Background

Glass cover articles are often used to protect devices within electronic products, to provide a user interface for input and/or display, and/or many other functions. Such products include mobile devices, such as smart phones, mp3 players, and computer tablets. However, some glass over articles may be susceptible to damage or total breakage caused by a mechanical event, such as scratching or dropping of the electronic device. Accordingly, a need exists for cover articles and electronics devices which are less susceptible to mechanical failure.

SUMMARY

According to one or more embodiments, an electronic device may comprise a display device operable to project an image, a front cover substrate positioned over the display device and comprising a transparent material, and a protective coating disposed on at least a portion of the non-display area of the front cover substrate. The front cover substrate may comprise a display area over the display device and a non-display area around at least the perimeter of the front cover substrate such that the display device is operable to project the image through the display area of the front cover substrate. The protective coating may comprise an inorganic material. The protective coating may not be positioned over the display area.

According to additional embodiments, a coated front cover substrate for an electronic device may comprise a display area and a non-display area around at least the perimeter of the front cover substrate such that an image may be viewed through the display area of the front cover substrate, and a protective coating disposed on at least a portion of the non-display area of the front cover substrate. The protective coating may comprise an inorganic material. The protective coating may not be positioned over the display area.

According to additional embodiments, a method for manufacturing an electronic device may comprise the steps of assembling a housing, one or more computer components, and a display device. The housing may comprise a front cover substrate that is positioned over the display device and comprises a transparent material. The front cover substrate may comprise a display area over the display device and a non-display area around at least the perimeter of the front cover substrate such that the display device is operable to project the image through the display area of the front cover substrate. A protective coating may be disposed on at least a portion of the non-display area of the front cover substrate, the protective coating comprising an inorganic material, wherein the protective coating is not positioned over the display area.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Mechanical degradation (e.g., scratching) and/or failure (e.g., cracking) of cover substrates, such as glass sheets, is a perpetual problem for electronic devices which incorporate displays, such as tablets and cellular phones. While coatings may be utilized which reduce the susceptibility of a cover substrate to scratching or other breakage, these coatings may cause discoloration or other undesirable optical characteristics to the projected image of the display. For example, some protective coatings may cause discoloration, light scattering, glitter effect, and/or increased reflectivity which are perceivable to a user. While protective coatings which are not optically perceivable may be utilized on the cover article, such coatings may include numerous layers and be costly to produce.

It has been discovered that a high degree of mechanical degradation and/or mechanical failure to cover substrates may originate at its edges, which are not generally areas upon which the display projects an image. For example, these edge regions may be opaque in appearance and surround the display area of the cover article (sometimes referred to herein as a cover substrate). Since these regions at or near the edge of the cover article are not adjacent the display, some discoloration caused by a protective coating may be tolerable. As such, a protective coating may be incorporated over at least a portion of the non-display area of the cover article for scratch and other damage resistance while not interfering with the optical properties of the display. The protection offered by the protective coatings disclosed herein, positioned at least around the edges of the cover substrate, may be adequate to avoid breakage of the cover substrate while being relatively inexpensive as compared with a multilayer functionalized optical coating designed to be colorless and/or reduce reflectivity. As described herein, the use of a protective coating on at least a portion of the non-display area of a cover substrate may be relatively inexpensive as compared to functionalized optical coatings, may not optically interfere with the display, and may offer increased protection to the cover article at or near its edges where it is susceptible to scratching and mechanical failure. The coated articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that would benefit from some transparency, scratch-resistance, abrasion resistance or a combination thereof.

Figure 1:
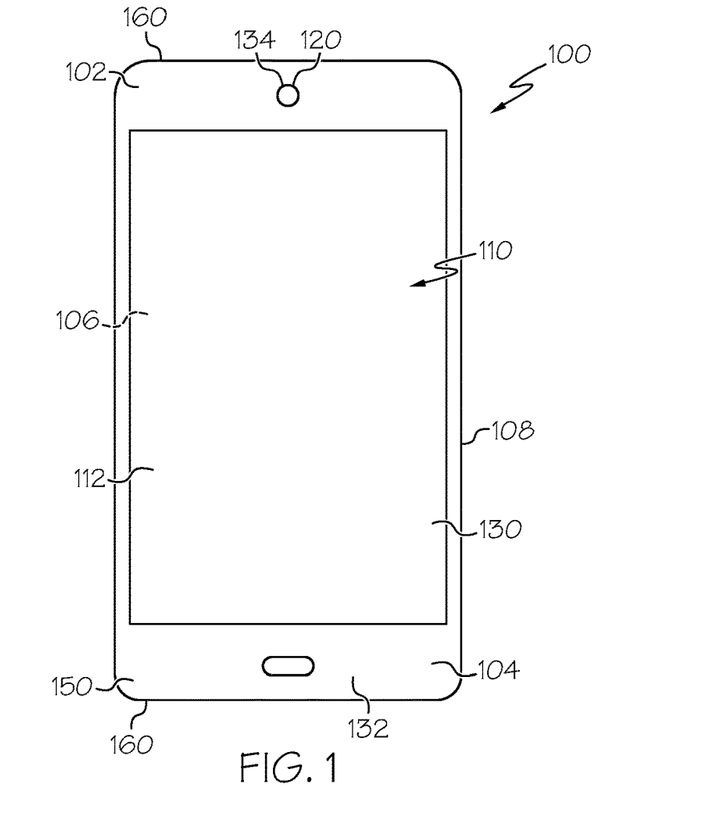
FIG. 1 depicts a schematic plan view of an electronic device incorporating a coated cover substrate, according to one or more embodiments described herein.
Figure 2:
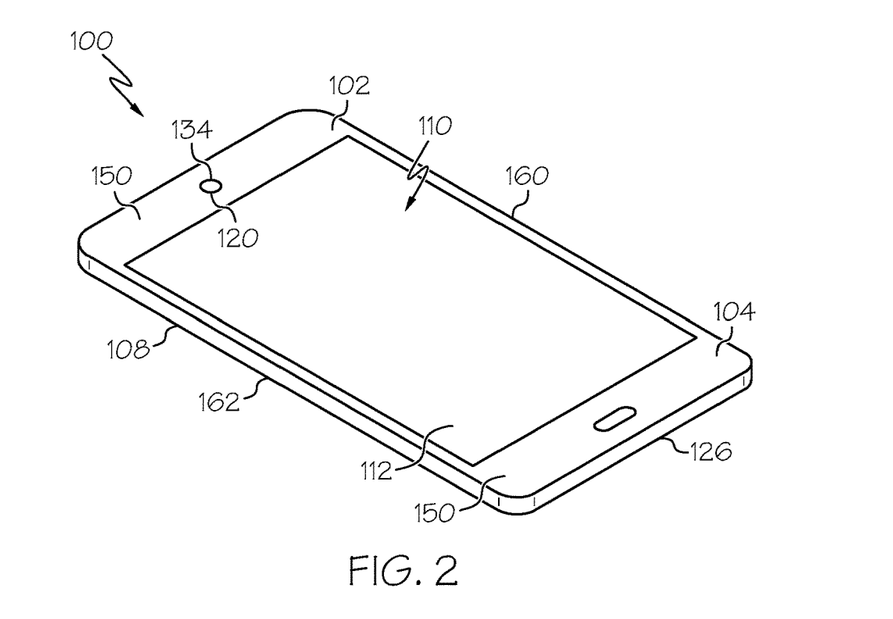
FIG. 2 depicts a schematic perspective view of the front side of the electronic device of FIG. 1, according to one or more embodiments described herein.
Figure 3:
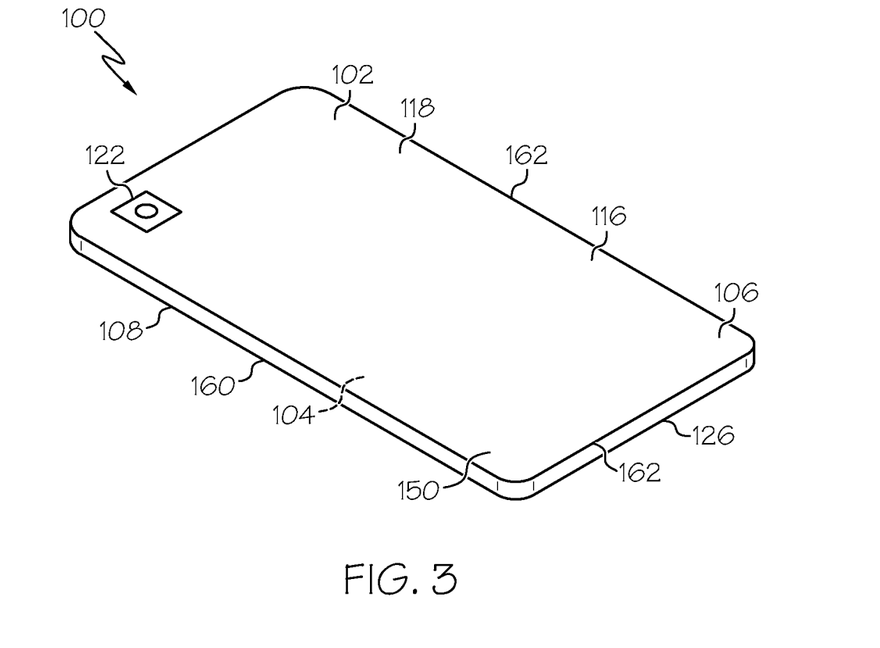
FIG. 3 depicts a schematic perspective view of the backside of the electronic device of FIG. 1, according to one or more embodiments described herein.

Reference will now be made in detail to various embodiments of coated articles for electronic devices, such as coated glass sheets used as cover substrates in electronic devices, examples of which are illustrated in the accompanying drawings. It should be understood that, as described herein, a coated glass article need not be coated on all surfaces, and in many embodiments presently disclosed, is not coated in one or more regions. Referring now to FIG. 1, an electronic device 100 is depicted which includes a housing 102 which includes a front surface 104, a back surface 106, and side surfaces 108. The electronic device may further comprise electrical components (not shown in FIG. 1) that are at least partially inside or entirely within the housing 102 and include computer components such as at least a controller, a memory, a wireless data transmitter/receiver, and a display device 110 at or adjacent to the front surface 104 of the housing 102. The front surface 104 may comprise a front cover substrate 112 such that it is over the display device 110. FIGS. 2 and 3 depict perspective views of the top and bottom of the electronic device 100 of FIG. 1, where like reference numbers are utilized in FIGS. 2 and 3 with respect to FIG. 1. As shown in FIG. 3, the back surface 106 may comprise a back substrate 118, such may be a back cover substrate 116 comprising a protective coating 150. However, in some embodiments, the back substrate 118 may be integral with side housing 126, and may be an opaque material such as plastic, ceramic, or metal. The electronic device 100 may further comprise one or more cameras, such as front camera 120 and back camera 122. The front camera 120 and back camera 122 may be positioned within the housing 102. For example, the front camera 120 may be positioned beneath the front cover substrate 112 and the back camera 122 may be positioned beneath the back substrate 118. According to the embodiments disclosed herein, at least a portion of the front cover substrate 112 or a portion of the back substrate 118 may be coated with the protective coatings disclosed herein.

According to one or more embodiments, the front cover substrate 112 may comprise a display area 130 and a non-display area 132. If a front camera 120 is present in the electronic device 100, then the front cover substrate 112 may further comprise a camera area 134 distinct from the display area 130 and non-display area 132. As described herein, the display area 130 of the front cover substrate 112 is the portion of the front cover substrate 112 in which an image is viewable through the front cover substrate 112 (e.g., the area of the front cover substrate 112 in which the display device 110 is directly adjacent). Similarly, the camera area 134 of the front cover substrate 112 is the portion of the front cover substrate 112 in which the front camera 120 may receive an image through the front cover substrate 112. The front cover substrate 112 may be transparent in these regions (i.e., the display area 130 and/or the camera area 134) such as to not noticeably interfere with the color, brightness, etc. of the image displayed by the display device 110 or the incoming light incident on the front camera 120. The non-display area 132 may have an opaque appearance, such as when an opaque layer 124 is positioned behind the non-display area 132 of the front cover substrate 112. It should be understood that additional contemplated embodiments of the front cover substrate 112 may have other functionalized areas (besides the display area 130 and the camera area 134) which utilize a transparent (and sometimes colorless) appearance. These areas may be distinct from the non-display area 132 of the front cover substrate 112, which may not require any particular degree of colorlessness and/or transparency.

Figure 4:
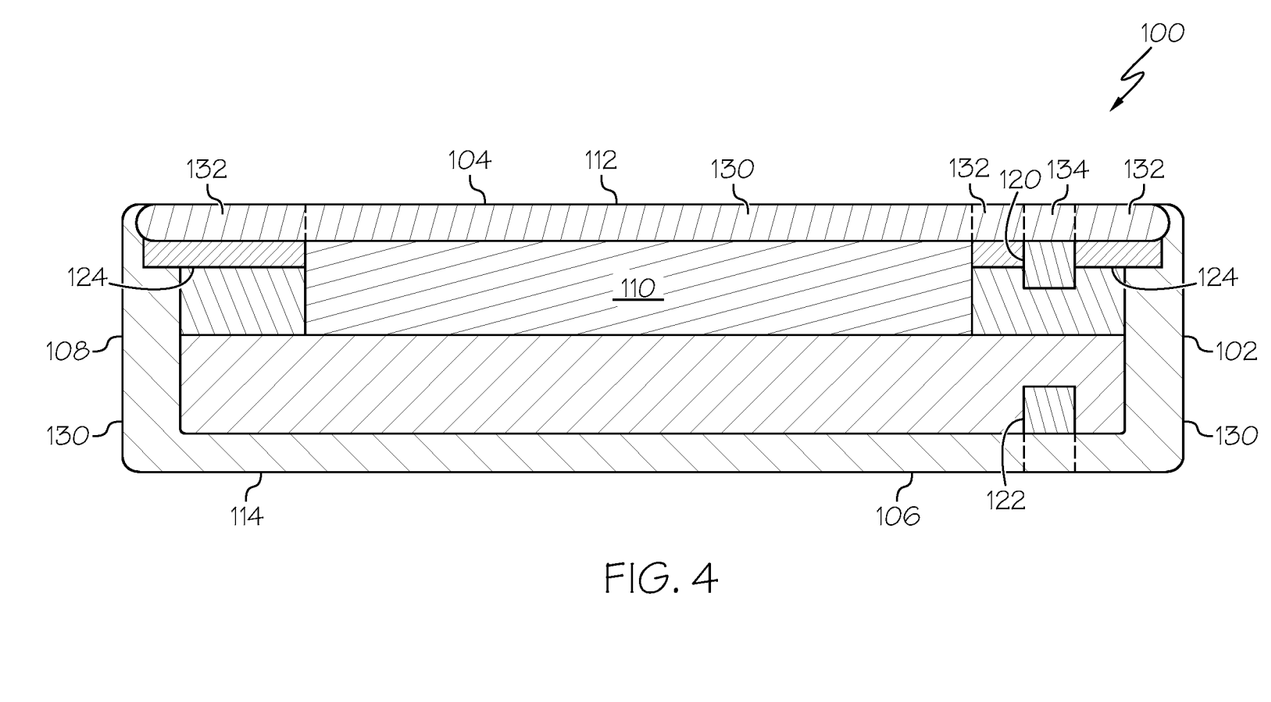
FIG. 4 depicts a schematic cross-sectional side view of an electronic device, according to one or more embodiments described herein.
Figure 5:
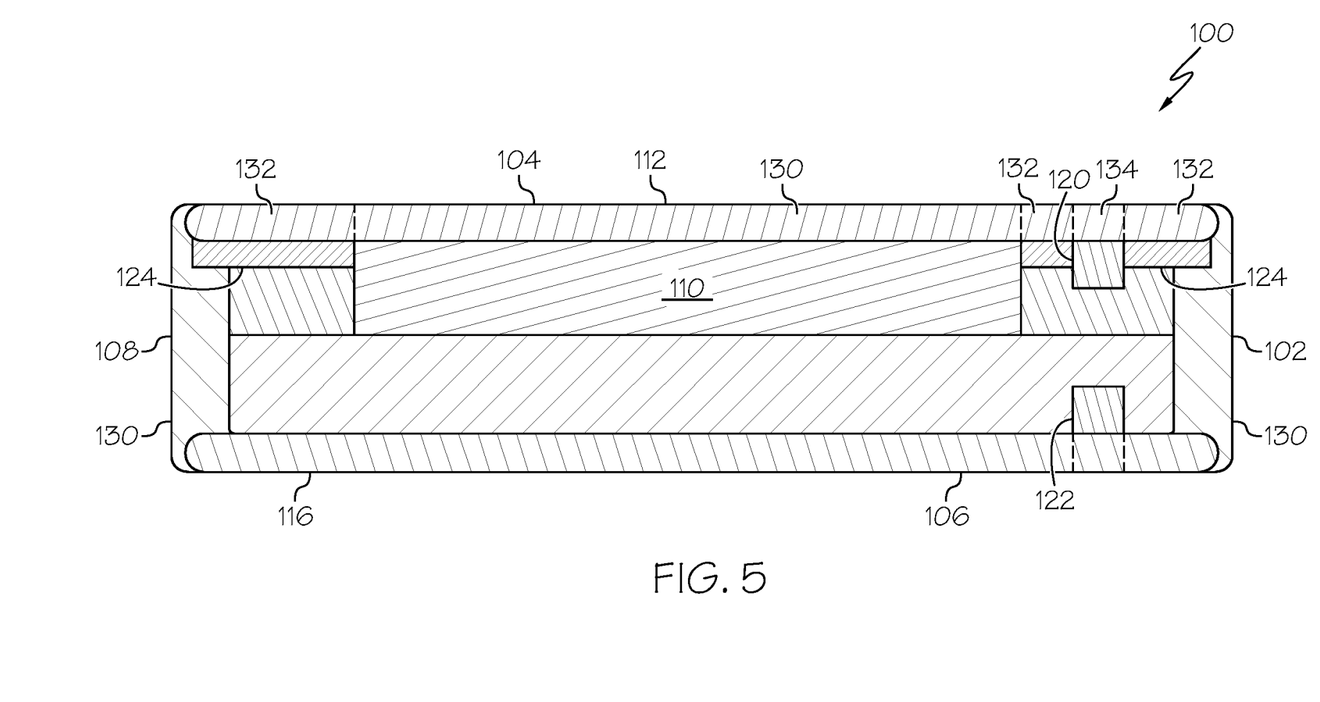
FIG. 5 depicts a schematic cross-sectional side view of another embodiment of an electronic device, according to one or more embodiments described herein.

Now referring to FIGS. 4 and 5, cross-sections of electronic devices 200 are schematically depicted. FIG. 4 depicts a housing 102 comprising a front cover substrate 112 and a housing body 114 with an integral side surface 108 and back surface 106. According to some embodiments, an opaque material may be used as the housing body 114, such as metal, ceramic, or plastic. The configuration of FIG. 4 may be representative of an electronic device 100 with a metal casing and a front cover substrate 112 which is transparent, such as a glass sheet. FIG. 5 depicts an alternative configuration in which the side housing 126 at the side surface 108 of the housing 102 is not integral with the back surface 106. In such a configuration, a front cover substrate 112 and a back cover substrate 116 may be glass, glass-ceramic, or ceramic sheets, which may in some embodiments be transparent to one or more wavelengths of radiation. Such embodiments may be useful when electronic transmissions such as cellular data are transmitted through the back surface 106 of the housing 102.

In one or more embodiments, an opaque layer 124 may be positioned below, and sometimes adjacent to, the non-display area 132 of the front cover substrate 112. The opaque layer 124 may be a solid layer which is positioned within the housing 102 of the electronic device 100, or may be a coating applied to some or all of the underside of the front cover substrate 112. The opaque layer may provide for a surface which is black, white, another color, textured, patterned, etc., at least partially surrounding the display area 130. In some embodiments, an opaque layer 124 may be provided on the underside (i.e., interior surface) of a back cover substrate 116. For example, an opaque layer 124 may provide a solid color on the back cover substrate 116 of the electronic device 100.

Still referring to FIGS. 4 and 5, according to one or more embodiments, the front cover substrate 112 includes opposing major surfaces and opposing minor surfaces. The major surface may be substantially planar in one or more portions of the front cover substrate 112. However, in some embodiments, the major surface may be non-planar, such as curved in one or more portions or curved over the entire major surface. In embodiments which include a back cover substrate 116, such as that of FIG. 5, the back cover substrate 116 may include opposing major surfaces and opposing minor surfaces. The major surface may be substantially planar in one or more portions of the back cover substrate 116. However, in some embodiments, the major surface may be non-planar, such as curved in one or more portions or curved over the entire major surface.

According to one or more embodiments, the front cover substrate 112, the back cover substrate 116, or both, may be transparent. Suitable materials for the front cover substrate 112, back cover substrate 116, or both, may include amorphous materials, crystalline materials, polymeric materials, or combinations thereof. For example, the front cover substrate 112, back cover substrate 116, or both, may include or consist of glass, ceramic, glass-ceramic, polymers, or combinations thereof. The front cover substrate 112, back cover substrate 116, or both, may be formed from man-made materials and/or naturally occurring materials (e.g., quartz and polymers). For example, in some instances, the front cover substrate 112, back cover substrate 116, or both, may be characterized as organic and may specifically be polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In some specific embodiments, the front cover substrate 112, back cover substrate 116, or both, may exclude polymeric, plastic and/or metal substrates. The front cover substrate 112, back cover substrate 116, or both, may be characterized as alkali-including substrates (i.e., the substrate includes one or more alkalis).

In one or more embodiments, the front cover substrate 112, back cover substrate 116, or both, may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the front cover substrate 112, back cover substrate 116, or both, may include crystalline substrates such as glass-ceramic substrates (which may be strengthened or non-strengthened) or may include a single crystal structure, such as sapphire. In one or more specific embodiments, the front cover substrate 112, back cover substrate 116, or both, includes an amorphous base (e.g., glass) and a crystalline cladding (e.g., sapphire layer, a polycrystalline alumina layer and/or or a spinel ($MgAl_2O_4$) layer).

The front cover substrate 112, back cover substrate 116, or both, may be substantially optically clear, transparent and free from light scattering. In such embodiments, the front cover substrate 112, back cover substrate 116, or both, may exhibit an average light transmission over the optical wavelength regime of about 85% or greater, about 86% or greater, about 87% or greater, about 88% or greater, about 89% or greater, about 90% or greater, about 91% or greater or about 92% or greater. In some embodiments, these light reflectance and transmittance values may be a total reflectance or total transmittance (taking into account reflectance or transmittance on both major surfaces of the substrate) or may be observed on a single side of the substrate. Unless otherwise specified, the average reflectance or transmittance of the substrate alone is measured at an incident illumination angle of 90 degrees relative to the major surface (however, "normal incidence" is typically described as 0 degrees, even though it is measured at 90 degrees relative to the major surface), and angles measured therefrom, such measurements may be provided at near-normal angle of incidence, i.e., within 10 degrees of normal incidence, or at other incident illumination angles of 45 degrees or 60 degrees, from normal incidence, for example.

Additionally or alternatively, the physical thickness of the front cover substrate 112, back cover substrate 116, or both, may vary along one or more of its dimensions for aesthetic and/or functional reasons. For example, the edges of the front cover substrate 112, back cover substrate 116, or both, may be thicker as compared to more central regions of the front cover substrate 112, back cover substrate 116, or both, respectively. The length, width and physical thickness dimensions of the front cover substrate 112, back cover substrate 116, or both, may also vary according to the application or use of the front cover substrate 112 or back cover substrate.

The front cover substrate 112 and back cover substrate 116 may be provided using a variety of different processes. For instance, where the front cover substrate 112 or back cover substrate 116 includes an amorphous substrate such as glass, various forming methods can include float glass processes, rolling processes, blowing processes, and down-draw processes such as fusion draw and slot draw. Molding and/or cutting techniques may be utilized to shape the geometry of the front cover substrate 112 or back cover substrate 116

Once formed, the front cover substrate 112, back cover substrate 116, or both, may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the front cover substrate 112, back cover substrate 116, or both, is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps such as annealing, washing, and the like, are generally determined by the composition of the substrate and the desired compressive stress (CS), depth of compressive stress layer (DOC) (or depth of potassium ion penetration—DOL) of the substrate that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass substrates are strengthened by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

The degree of chemical strengthening achieved by ion exchange may be quantified based on the parameters of central tension (CT), surface CS, depth of compression (DOC), and depth of potassium layer (DOL). Compressive stress (including surface CS) may be measured by surface stress meter (FSM) using commercially available instruments such as the FSM-6000, manufactured by Orihara Industrial Co., Ltd. (Japan). Surface stress measurements may rely upon the accurate measurement of the stress optical coefficient (SOC), which is related to the birefringence of the glass. SOC, in turn, may be measured according to Procedure C (Glass Disc Method) described in ASTM standard C770-16, entitled "Standard Test Method for Measurement of Glass Stress-Optical Coefficient," the contents of which are incorporated herein by reference in their entirety. As used herein, DOC means the depth at which the stress in the chemically strengthened alkali aluminosilicate glass article described in some embodiments herein changes from compressive to tensile. DOC may be measured by FSM or a scattered light polariscope (SCALP) depending on the ion exchange treatment. Where the stress in the glass article is generated by exchanging potassium ions into the glass article, FSM may be used to measure DOC. Where the stress is generated by exchanging sodium ions into the glass article, SCALP may be used to measure DOC. Where the stress in the glass article is generated by exchanging both potassium and sodium ions into the glass, the DOC may be measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles may be measured by FSM. Maximum CT values may be measured using a SCALP technique as known in the art.

In one or more embodiments, the front cover substrate 112, back cover substrate 116, or both, can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate may have a DOC of 10 µm or greater, 15 µm or greater, 20 µm or greater (e.g., 25 µm, 30 µm, 35 µm, 40 µm, 45 µm, 50 µm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the front cover substrate 112, back cover substrate 116, or both, has one or more of the following: a surface CS greater than 500 MPa, a DOC greater than 15 µm, and a CT greater than 18 MPa.

Optionally, the front cover substrate 112, back cover substrate 116, or both, may include a glass-ceramic material, which may be strengthened or non-strengthened. Examples of suitable glass-ceramics may include $Li_2O$—$Al_2O_3$—$SiO_2$ system (i.e. LAS-System) glass-ceramics, $MgO$—$Al_2O_3$—$SiO_2$ system (i.e. MAS-System) glass-ceramics, and/or glass-ceramics that include a predominant crystal phase including β-quartz solid solution, β-spodumene ss, cordierite, and lithium disilicate. The glass-ceramic substrates may be strengthened using the chemical strengthening processes disclosed herein. In one or more embodiments, MAS-System glass-ceramic substrates may be strengthened in $Li_2SO_4$ molten salt, whereby an exchange of $2Li^+$ for $Mg^{2+}$ can occur.

The front cover substrate 112, back cover substrate 116, or both, according to one or more embodiments, can have a physical thickness ranging from about 100 µm to about 5 millimeters (mm) in various portions of the substrates. Example substrate physical thicknesses range from about 100 µm an to about 500 µm (e.g., 100, 200, 300, 400 or 500 µm). Further example substrate physical thicknesses range from about 500 µm to about 1000 µm (e.g., 500, 600, 700, 800, 900 or 1000 µm). The front cover substrate 112, back cover substrate 116, or both, may have a physical thickness greater than about 1 mm (e.g., about 2, 3, 4, or 5 mm). In one or more specific embodiments, the front cover substrate 112, back cover substrate 116, or both, may have a physical thickness of 2 mm or less, or less than 1 mm. The front cover substrate 112, back cover substrate 116, or both, may be acid polished or otherwise treated to remove or reduce the effect of surface flaws.

Referring again to FIGS. 1-5, the display device 110 may be positioned beneath the front cover substrate 112. As described herein, a display device may refer to any device located within the electronic device 100 which is operable to project an image through the front cover substrate 112 in the display area 130. The display device 110 may comprise a display member such as, but not limited to, an LCD panel or any other suitable display which can project an image. The display device 110 may also include a back light apparatus which can project light into and through the display member to provide light for projecting the image in the display area 130. The backlight may be behind the display member, such that the display member, such as an LCD panel, is sandwiched between the backlight and the front cover substrate 112. Additionally, while not depicted herein, some embodiments of electronic devices may include a display device for projecting an image through the back cover substrate 116. In such embodiments, a display area and non-display area may be defined on the back cover substrate 116.

As described herein, portions of the front cover substrate 112, back cover substrate 116, or both, may include a protective coating 150 over at least a portion of its surface. Generally, the protective coating may be disposed over portions of the front cover substrate 112, back cover substrate 116, or both, which can tolerate some coloring caused by the protective coating's appearance. As used herein, the term "dispose" includes coating, depositing, and/or forming a material onto a surface using any known or to be developed method in the art. The disposed material may constitute a layer, as defined herein. As used herein, the phrase "disposed on" includes forming a material onto a surface such that the material is in direct contact with the surface, or alternatively includes embodiments where the material is formed on a surface with one or more intervening material(s) disposed between material and the surface. The intervening material(s) may constitute a layer, as defined herein.

As depicted in FIG. 1, the non-display area 132 may include regions of the front cover substrate 112 at or near the outer edges 160 of the front cover substrate 112. According to one or more embodiments, the protective coating 150 may be disposed at the edges 160 of the front cover substrate 112. In additional embodiments, the protective coating 150 may also be disposed on other portions of the front cover substrate 112 in the non-display area 132. However, it should be understood that, in some embodiments, the protective coating 150 of the non-display area 132 is not disposed on one or more of the display area 130, the camera area 134, or other regions of the front cover substrate 112 which are sensitive to discoloration or other optical effects which may be imparted on the front cover substrate 112 by the protective coating 150. The protective coating 150 may have a perceivable color if positioned over the display area 130, but may not be perceivable, or may be tolerable, when positioned over the non-display area 132. As described herein, the "perceivable color" of the protective coating 150 is defined as color perceivable to the average person if the protective coating 150 were disposed over the image of the display area 130.

In one or more embodiments, the protective coating 150 exhibits a measurable color (or lack thereof) in reflectance and/or transmittance in the CIE L*a*b* colorimetry system (referred to herein as a "color coordinate"). The transmittance color coordinates refer to the observed L*a*b* color coordinates in transmittance and the reflectance color coordinates refer to the observed L*a*b* color coordinates in reflectance. The transmittance color coordinates or reflectance color coordinates may be measured under a variety of illuminant light types, which may include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting)). Specific illuminants include F2, F10, F11, F12 or D65, as defined by CIE. Additionally, the reflectance color coordinates and transmittance color coordinates may be measured at different observed angles of incidence, such as normal (0 degrees), or 5 degrees, 10 degrees, 15 degrees, 30 degrees, 45 degrees, or 60 degrees from normal. The L*a*b* color coordinates (i.e., L*, a*, and b*) of the protective coating 150 may be measured by analyzing the protective coating 150 while applied to a completely colorless substrate. An a* or b* other than 0 indicates measurable color.

In one or more embodiments, the protective coating 150 has a* of greater than or equal to 2, 4, 6, 8, or even 10 in transmittance and/or reflectance when viewed at a normal angle of incidence, or an angle of incidence of 5 degrees, 10 degrees, 15 degrees, 30 degrees, 45 degrees, or 60 degrees from normal. In one or more embodiments, the protective coating 150 has b* of greater than or equal to 2, 4, 6, 8, or even 10 in transmittance and/or reflectance when viewed at a normal angle of incidence, or an angle of incidence of 5 degrees, 10 degrees, 15 degrees, 30 degrees, 45 degrees, or 60 degrees from normal.

As shown in FIGS. 1-5, the protective coating may be deposited on all or some of the non-display area 132 of the front cover substrate 112 and/or back cover substrate 116.

Figure 6A:
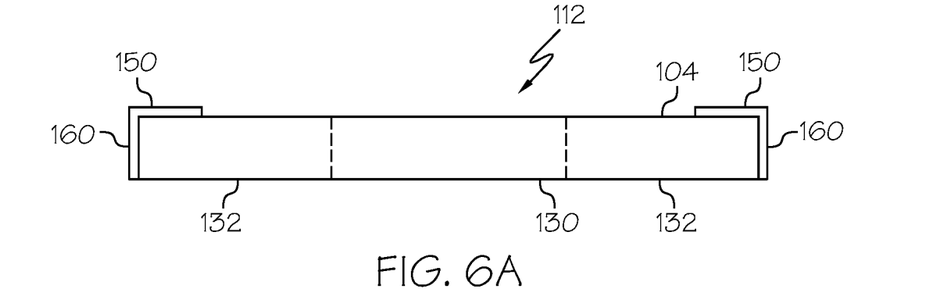
FIGS. 6A-6D depict schematic cross-sectional side views of coated cover substrates for electronic devices, according to one or more embodiments described herein.
Figure 6B:
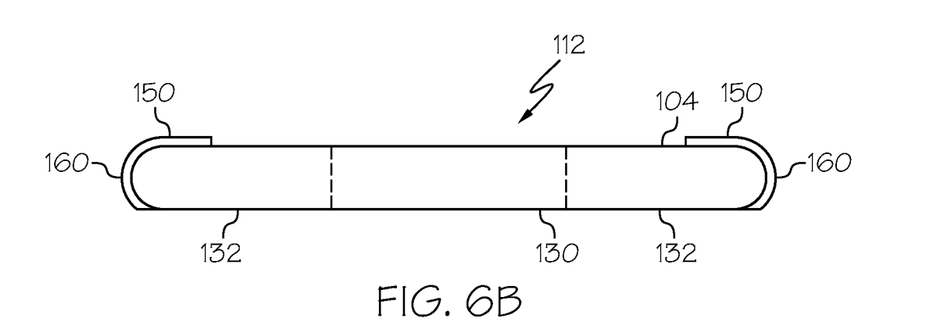
Figure 6C:
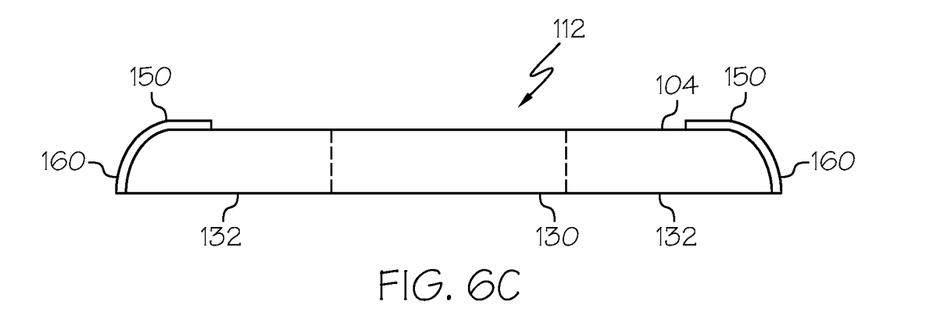
Figure 6D:
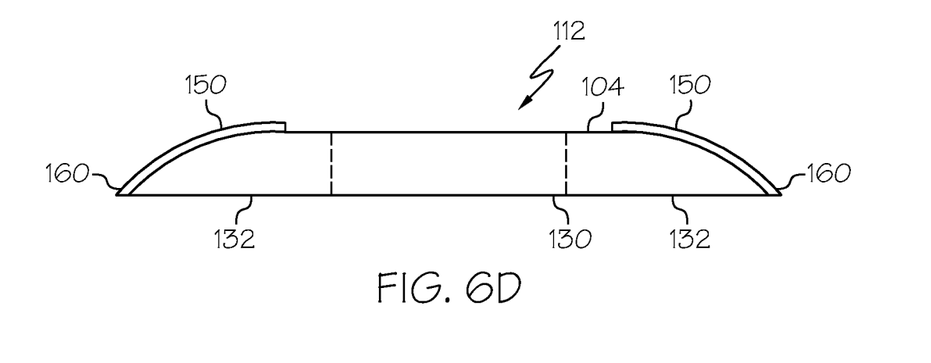
Figure 7A:
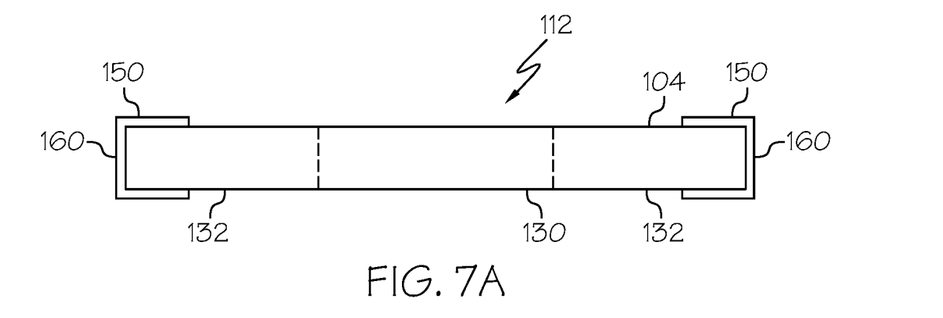
FIGS. 7A-7D depict schematic cross-sectional side views of coated cover substrates for electronic devices, according to one or more embodiments described herein.
Figure 7B:
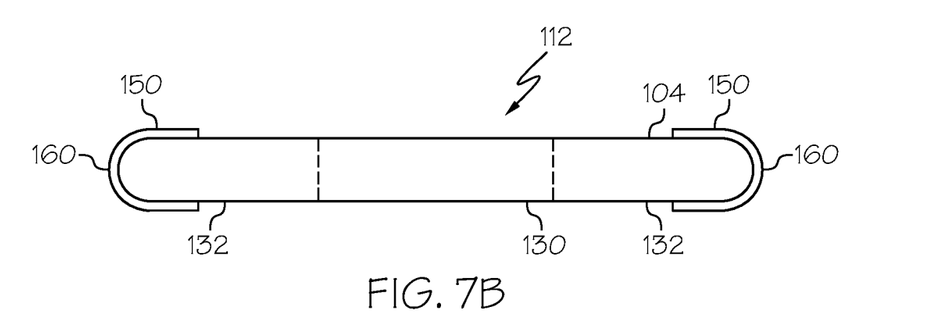
Figure 7C:
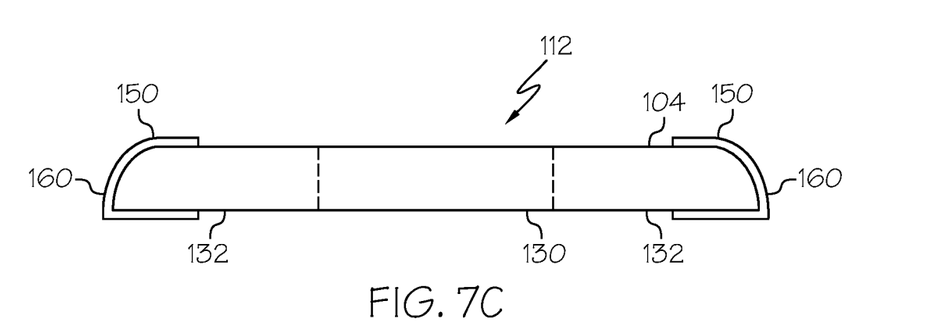
Figure 7D:
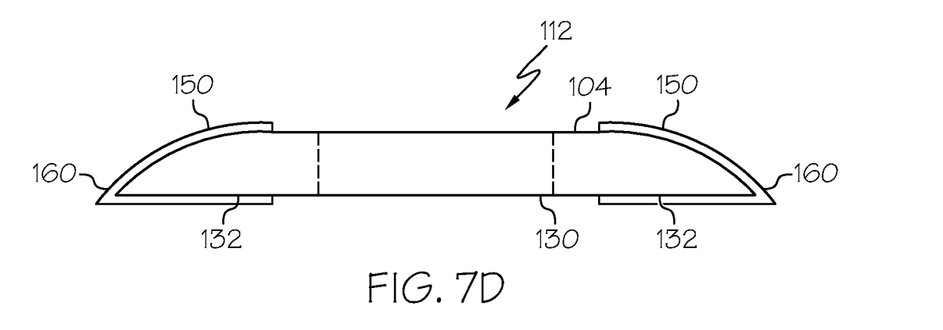
Figure 8A:
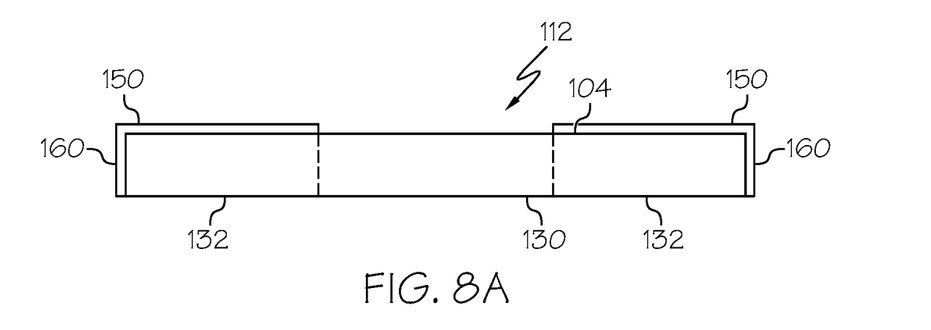
FIGS. 8A-8D depict schematic cross-sectional side views of coated cover substrates for electronic devices, according to one or more embodiments described herein.
Figure 8B:
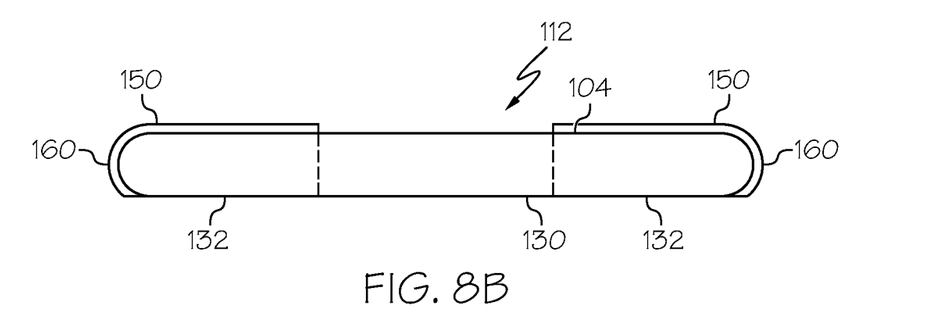
Figure 8C:
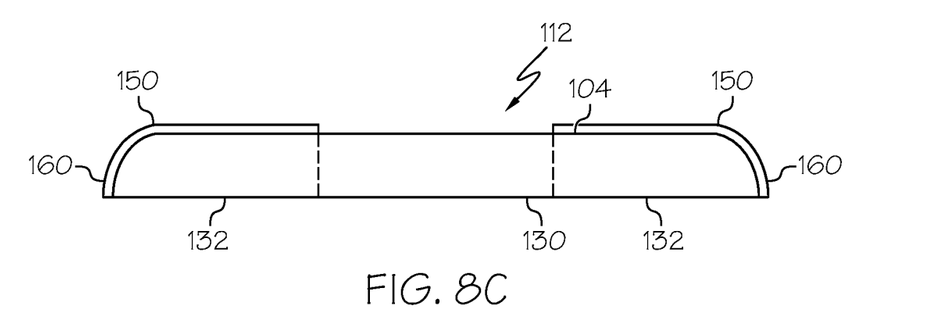
Figure 8D:
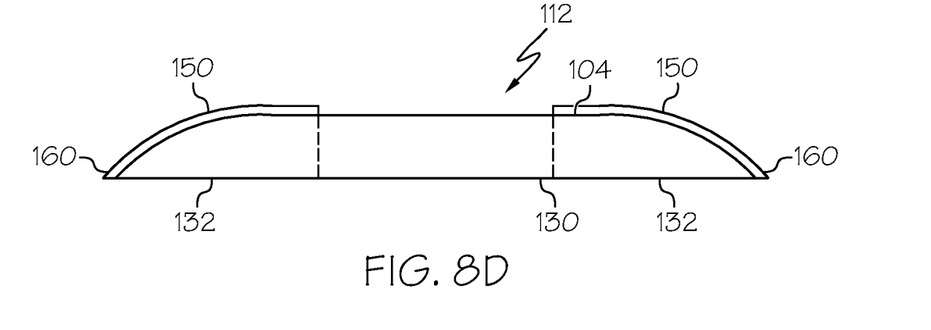
Figure 9A:
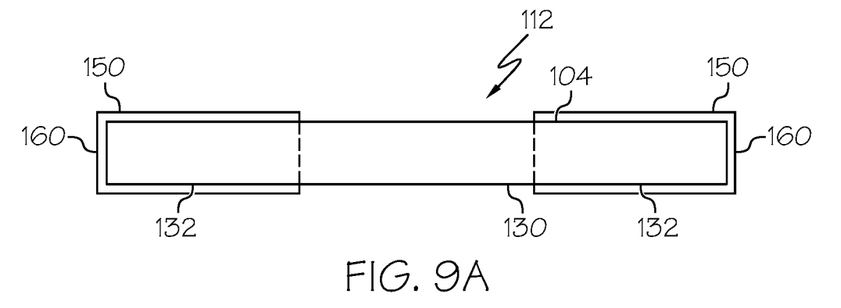
FIGS. 9A-9D depict schematic cross-sectional side views of coated cover substrates for electronic devices, according to one or more embodiments described herein.
Figure 9B:
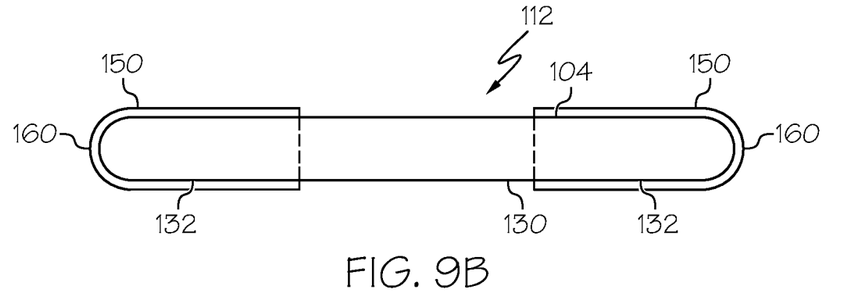
Figure 9C:
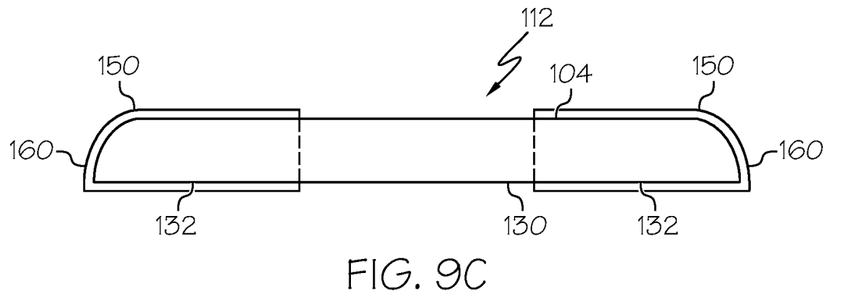
Figure 9D:
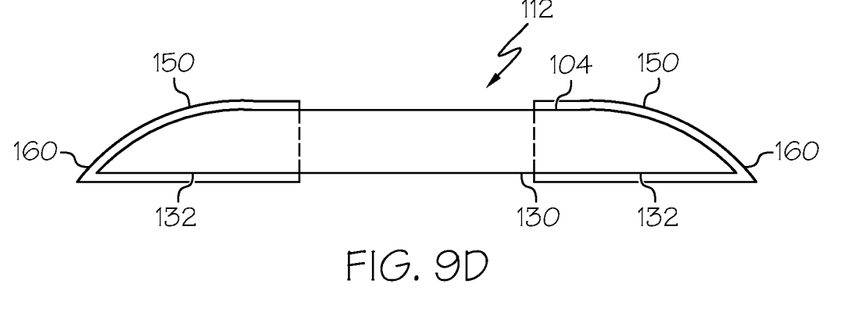

Referring now to FIGS. 6A-6D, cross-sectional side views of example front cover substrates 112 that include protective coatings 150 are depicted. FIG. 6A depicts a square edged geometry, FIG. 6B depicts a nose edge geometry, FIG. 6C depicts a tapered edge geometry, and FIG. 6D depicts another tapered edge geometry. The front cover substrates 112 of FIGS. 6A-6D include a protective coating 150 over the outer edges 160 of the front cover substrate 112. The front cover substrates of FIGS. 6A-6D also include the protective coating 150 over a portion of the non-display area 132 on the front surface 104 of the front cover substrate 112. However, the protective coating 150 does not extend over the entirety of the non-display area 132 in the embodiments of FIGS. 6A-6D. The protective coating 150 may extend from the outer edges 160 several millimeters, such as to sufficiently protect the area around the outer edges 160 but not the entirety of the non-display area 132 of the front cover substrate 112.

Now referring to FIGS. 7A-7D, cross-sectional side views of example front cover substrates 112 that include protective coatings 150 are depicted, where in addition to the protective coating 150 at the outer edges 160 of the front cover substrate 112 and a portion of the front surface 104 of the front cover substrate 112 in the non-display area 132, a portion of the back surface 106 of the front cover substrate 112 at the non-display area 132 is coated with the protective coating 150. In some embodiments, the protective coating 150 on the front surface 104 and the back surfaces 106 may provide symmetric strain on the front cover substrate 112 such that the front cover substrate 112 does not bend due to uneven amounts of stress on its upper and lower sides.

Additional embodiments of front cover substrates 112 with protective coatings 150 are depicted in FIGS. 8A-8D and 9A-9D. FIGS. 8A-8D depict front cover substrates 112 where the protective coating 150 is disposed over substantially the entire non-display area 132 on the front surface 104 of the front cover substrate 112. As described herein, substantially over the entire non-display area refers to a coating being disposed over at least 95% of the non-display area (either on the top or bottom of the substrate). FIGS. 9A-9D depict front cover substrates 112 where the protective coating 150 in disposed over the entire non-display area 132 on the front surface 104 and the back surface 106 of the front cover substrate 112.

Similarly, the back cover substrate 116 may include the protective coating 150 in areas such as depicted in FIGS. 6A-6D, 7A-7D, 8A-8D, and 9A-9D. For example, if the back cover substrate 116 includes a display, then the display area 130 of front cover substrate 112 in these FIGS. can be representative of a display area or camera area on the back cover substrate 116. As the display area 130 of the front cover substrate 112 may not be covered with the protective coating 150, in some embodiments, 50% or more of the front cover substrate does not include the protective coating.

According to one or more embodiments, the protective coating 150 may comprise a inorganic material such as, but not limited to, $Si_uAl_vO_xN_y$, $Ta_2O_5$, $Nb_2O_5$, AlN, $Si_3N_4$, $AlO_xN_y$, $SiO_xN_y$, $SiN_x$, $SiN_x$:$H_y$, $HfO_2$, $TiO_2$, $ZrO_2$, $Y_2O_3$, $Al_2O_3$, $MoO_3$, TiC, TiB, TiBC, SiC, $Si_nO_xC$, diamond-like carbon, diamond film, or combinations thereof. In general, the protective coating 150 may provide mechanical protection to the front cover substrate 112 or back cover substrate 116 at the outer edges where damage may be more likely to occur and cracks may propagate.

As used herein, the "$AlO_xN_y$," "$SiO_xN_y$," and "$Si_uAl_xO_yN_z$" materials in the disclosure include various aluminum oxynitride, silicon oxynitride and silicon aluminum oxynitride materials, as understood by those with ordinary skill in the field of the disclosure, described according to certain numerical values and ranges for the subscripts, "u," "x," "y," and "z". That is, it is common to describe solids with "whole number formula" descriptions, such as $Al_2O_3$. It is also common to describe solids using an equivalent "atomic fraction formula" description such as $Al_{0.4}O_{0.6}$, which is equivalent to $Al_2O_3$. In the atomic fraction formula, the sum of all atoms in the formula is 0.4+0.6=1, and the atomic fractions of Al and O in the formula are 0.4 and 0.6 respectively. Atomic fraction descriptions are described in many general textbooks and atomic fraction descriptions are often used to describe alloys. (See, e.g.: (i) Charles Kittel, "Introduction to Solid State Physics," seventh edition, John Wiley & Sons, Inc., NY, 1996, pp. 611-627; (ii) Smart and Moore, "Solid State Chemistry, An Introduction," Chapman & Hall University and Professional Division, London, 1992, pp. 136-151; and (iii) James F. Shackelford, "Introduction to Materials Science for Engineers," Sixth Edition, Pearson Prentice Hall, New Jersey, 2005, pp. 404-418.)

Again referring to the "$AlO_xN_y$," "$SiO_xN_y$," and "$Si_uAl_xO_yN_z$" materials in the disclosure, the subscripts allow those with ordinary skill in the art to reference these materials as a class of materials without specifying particular subscript values. That is, to speak generally about an alloy, such as aluminum oxide, without specifying the particular subscript values, we can speak of $Al_vO_x$. The description $Al_vO_x$ can represent either $Al_2O_3$ or $Al_{0.4}O_{0.6}$. If v+x were chosen to sum to 1 (i.e., v+x=1), then the formula would be an atomic fraction description. Similarly, more complicated mixtures can be described, such as $Si_uAl_vO_xN_y$, where again, if the sum u+v+x+y were equal to 1, we would have the atomic fractions description case.

Once again referring to the "$AlO_xN_y$," "$SiO_xN_y$," and "$Si_uAl_xO_yN_z$" materials in the disclosure, these notations allow those with ordinary skill in the art to readily make comparisons to these materials and others. That is, atomic fraction formulas are sometimes easier to use in comparisons. For instance, an example alloy consisting of $(Al_2O_3)_{0.3}(AlN)_{0.7}$ is closely equivalent to the formula descriptions $Al_{0.448}O_{0.31}N_{0.241}$ and also $Al_{367}O_{254}N_{198}$. Another example alloy consisting of $(Al_2O_3)_{0.4}(AlN)_{0.6}$ is closely equivalent to the formula descriptions $Al_{0.438}O_{0.375}N_{0.188}$ and $Al_{37}O_{32}N_{16}$. The atomic fraction formulas $Al_{0.448}O_{0.31}N_{0.241}$ and $Al_{0.438}O_{0.375}N_{0.188}$ are relatively easy to compare to one another. For instance, Al decreased in atomic fraction by 0.01, O increased in atomic fraction by 0.065 and N decreased in atomic fraction by 0.053. It takes more detailed calculation and consideration to compare the whole number formula descriptions $Al_{367}O_{254}N_{198}$ and $Al_{37}O_{32}N_{16}$. Therefore, it is sometimes preferable to use atomic fraction formula descriptions of solids. Nonetheless, the use of $Al_vO_xN_y$ is general since it captures any alloy containing Al, O and N atoms.

As understood by those with ordinary skill in the field of the disclosure with regard to any of the foregoing materials (e.g., AlN) for the protective coating 150, each of the subscripts, "u," "x," "y," and "z," can vary from 0 to 1, the sum of the subscripts will be less than or equal to one, and the balance of the composition is the first element in the material (e.g., Si or Al). In addition, those with ordinary skill in the field can recognize that "$Si_uAl_xO_yN_z$" can be configured such that "u" equals zero and the material can be described as "$AlO_xN_y$". Still further, the foregoing compositions for the protective coating 150 exclude a combination of subscripts that would result in a pure elemental form (e.g., pure silicon, pure aluminum metal, oxygen gas, etc.). However, in some embodiments, each of the elements listed in the formula is present to some degree. Additionally, those with ordinary skill in the art will also recognize that the foregoing compositions may include other elements not expressly denoted (e.g., hydrogen), which can result in non-stoichiometric compositions (e.g., $SiN_x$ vs. $Si_3N_4$). Accordingly, the foregoing materials for the optical film can be indicative of the available space within a $SiO_2$—$Al_2O_3$—$SiN_x$—AlN or a $SiO_2$—$Al_2O_3$—$Si_3N_4$—AlN phase diagram, depending on the values of the subscripts in the foregoing composition representations.

According to embodiments, the material of the protective coating 150 may have a greater elastic modulus than that of the front cover substrate 112, the back cover substrate 116, or both. For example, suitable materials for the front cover substrate 112, the back cover substrate 116, or both, as described herein, may exhibit an elastic modulus (or Young's modulus) in the range from ≥30 GPa to ≤120 GPa. In some instances, the elastic modulus of the front cover substrate 112, the back cover substrate 116, or both, may be in the range from ≥30 GPa to ≤110 GPa, from ≥30 GPa to ≤100 GPa, from ≥30 GPa to ≤90 GPa, from ≥30 GPa to ≤80 GPa, from ≥30 GPa to ≤70 GPa, from ≥40 GPa to ≤120 GPa, from ≥50 GPa to ≤120 GPa, from ≥60 GPa to ≤120 GPa, from ≥70 GPa to ≤120 GPa, and all ranges and sub-ranges therebetween. In some embodiments, the elastic modulus of the front cover substrate 112, the back cover substrate 116, or both, may be in the range from ≥60 GPa to ≤90 GPa, in some embodiments, from ≥65 GPa to ≤90 GPa, in some embodiments, from ≥65 GPa to ≤80 GPa, in some embodiments, from ≥70 GPa to ≤80 GPa. As described herein, in various embodiments, the front cover substrate 112, the back cover substrate 116, or both, may have a lesser modulus of elasticity than that of the protective coating 150, such that the protective coating 150 has a greater modulus of elasticity than the above disclosed example elasticities of the front cover substrate 112, the back cover substrate 116, or both. The Young's modulus value recited in this disclosure refers to a value as measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

According to additional embodiments, the maximum hardness of the portion of the front cover substrate 112, the back cover substrate 116, or both, which is covered with the protective coating 150 is greater than the maximum hardness of the front cover substrate 112, the back cover substrate 116, or both, in non-coated regions. For example, according to embodiments, the coated regions of the front cover substrate 112, the back cover substrate 116, or both, may have a maximum hardness of ≥10 GPa. In some embodiments, the maximum hardness at these regions can be ≥11 GPa, ≥12 GPa, ≥13 GPa, ≥14 GPa, ≥15 GPa, ≥16 GPa, ≥17 GPa, ≥18 GPa, ≥19 GPa, ≥20 GPa, and all maximum hardness values between these values. As used herein, the "maximum hardness value" of the is reported as measured on the top surface of the substrate using the Berkovich Indenter Hardness More particularly, according to the Berkovich Indenter Hardness Test, hardness of thin film coatings as reported herein was determined using widely accepted nanoindentation practices. See: Fischer-Cripps, A. C., Critical Review of Analysis and Interpretation of Nanoindentation Test Data, Surface & Coatings Technology, 200, 4153-4165 (2006) (hereinafter "Fischer-Cripps"); and Hay, J., Agee, P, and Herbert, E., Continuous Stiffness measurement During Instrumented Indentation Testing, Experimental Techniques, 34 (3) 86-94 (2010) (hereinafter "Hay"). For coatings, it is typical to measure hardness and modulus as a function of indentation depth. So long as the coating is of sufficient thickness, it is then possible to isolate the properties of the coating from the resulting response profiles. It should be recognized that if the coatings are too thin (for example, less than ~500 nm), it may not be possible to completely isolate the coating properties as they can be influenced from the proximity of the substrate which may have different mechanical properties. See Hay. The methods used to report the properties herein are representative of the coatings themselves. The process is to measure hardness and modulus versus indentation depth out to depths approaching 1000 nm. In the case of hard coatings on a softer glass, the response curves will reveal maximum levels of hardness and modulus at relatively small indentation depths (less than or equal to about 200 nm). At deeper indentation depths both hardness and modulus will gradual diminish as the response is influenced by the softer glass substrate. In this case the coating hardness and modulus are taken be those associated with the regions exhibiting the maximum hardness and modulus. In the case of soft coatings on a harder glass substrate, the coating properties will be indicated by lowest hardness and modulus levels that occur at relatively small indentation depths. At deeper indentation depths, the hardness and modulus will gradually increase due to the influence of the harder glass. These profiles of hardness and modulus versus depth can be obtained using either the traditional Oliver and Pharr approach (as described in Fischer-Cripps) or by the more efficient continuous stiffness approach (see Hay).

In one or more embodiments, the protective coating 150 may have thickness of from greater than or equal to 100 nm to less than or equal to 10 micrometers (microns or μm). For example, the protective coating 150 may have a thickness greater than or equal to 200 nm, greater than or equal to 300 nm, greater than or equal to 400 nm, greater than or equal to 500 nm, greater than or equal to 600 nm, greater than or equal to 700 nm, greater than or equal to 800 nm, greater than or equal to 900 nm, greater than or equal to 1 micron, greater than or equal to 2 microns, greater than or equal to 3 microns, greater than or equal to 4 microns, greater than or equal to 5 microns, greater than or equal to 6 microns, greater than or equal to 7 microns, or even greater than or equal to 8 microns, and less than or equal to 10 microns. As described herein, the "thickness" of a coating or layer refers to the thickness as measured substantially orthogonal to the surface of the substrate upon which the protective coating 150 is deposited. Thickness of the thin film elements (e.g., scratch-resistant film/layer, optical coating, layers of the optical coating, optical stack, etc.) may be measured by scanning electron microscope (SEM) of a cross-section, by optical ellipsometry (e.g., by an analyzer commercially available from n&k Technology), or by thin film reflectometry.

In one or more embodiments, a single layer or multiple layers of the protective coating 150 may be deposited onto the front cover substrate 112, the back cover substrate 116, or both, by a vacuum deposition technique such as, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation and/or atomic layer deposition. Liquid-based methods may also be used such as spraying, dipping, spin coating, or slot coating (e.g., using sol-gel materials). Generally, vapor deposition techniques may include a variety of vacuum deposition methods which can be used to produce thin films. For example, physical vapor deposition uses a physical process (such as heating or sputtering) to produce a vapor of material, which is then deposited on the object which is coated. The coatings area can be specified by methods including masking of particular regions of the front cover substrate 112 or back cover substrate 116. For example, the display area 130 of the front cover substrate 112 may be masked from deposition in order to dispose the protective coating 150 on in the non-display area 132 of the front cover substrate 112.

In one or more embodiments, a different coating, such as an optical stack may be disposed on the display area 130. The optical stack may include a plurality of layers, and may include at least one period comprising two layers, such as the low RI layer and high RI layer. The optical stack may include a plurality of periods. In other embodiments, a single period may include three layers such as a low RI layer, a medium RI layer, and a high RI layer.

According to one or more embodiments, one or more portions of the front cover substrate 112, the back cover substrate 116, or both, may include an easy-to-clean (ETC) coating. The ETC coating may be disposed over the protective coating 150. Additionally, the ETC coating may be disposed over the display area 130 of the front cover substrate 112. The ETC coating may comprise a fluorinated material, e.g., a perfluoropolyether (PFPE) silane, a pefluoroalkylether, a PFPE oil or other suitable fluorinated material. According to some embodiments, the thickness of the ETC coating is from ≥1 nm to ≤20 nm. In other embodiments, the thickness of the ETC coating ranges from ≥1 nm to ≤200 nm, from ≥1 nm to ≤100 nm, or from ≥1 nm to ≤50 nm. In some embodiments, the ETC coating may have a thickness of from ≥0.5 nm to ≤50 nm, from ≥1 nm to ≤25 nm, from about 4 nm to ≤25 nm, or from ≥5 nm to ≤20 nm. In other embodiments, the ETC coating may have a thickness of from ≥10 nm to ≤50 nm.

As understood by those with ordinary skill in the field of the disclosure, various source materials can be used to form the ETC coating. For example, ETC coating source materials may comprise perfluoropolyether (PFPE) silanes, perfluoropolyether (PFPEs) alkoxy silanes, copolymers of these PFPEs and mixtures of these PFPEs. In certain, exemplary embodiments of the electronic devices 100 of the disclosure, the ETC coating can comprise a perfluoropolyether (PFPE) silane of formula $[CF_3CF_2CF_2O)_a]_ySiX_{4-y}$, where a is from 5 to 50, y=1 or 2, and X is —Cl, acetoxy, —OCH$_3$ or OCH$_2$H$_3$, wherein the total perfluoropolyether chain length is 6-130 carbon atoms from the silicon atom to the end of the chain at its greatest length. In other aspects, "a" in the above formula can range from about 10 to 30. Further, it should be understood that the above PFPE formula is one of many suitable types of PFPE suitable for use in the ETC coatings of the disclosure; consequently, it is offered as an exemplary chemistry that is in no way intended to limit the formulas or mixtures of formulas suitable for the ETC coatings of the disclosure. As such, other PFPEs can be employed in the ETC coating that vary in the structure of the perfluoropolyether chain and/or attachment chemistry relative to the exemplary form provided above. For example, an Optool™ UF503 fluorinated coating material from Daikin Industries is another suitable PFPE that can be employed for the ETC coating. Another suitable ETC coating may be SH-HT anti-fingerprint coating material (commercially available from DON Co., Ltd., Korea). As used herein, the length of the carbon chain in nanometers ("nm") is the product of the number of carbon-carbon bonds along the greatest length of the chain multiplied by the carbon-carbon single bond length of 0.154 nm. In some embodiments, the carbon chain length of the perfluoropolyether (PFPE) group can range from ≥0.1 nm to ≤50 nm, from ≥0.5 nm to ≤25 nm, or from ≥1 nm to ≤20 nm.

As also noted earlier, embodiments of the ETC coating can comprise a PFPE oil. In general, PFPE oils are characterized by oxidation resistance. In further aspects, the PFPE oil of the ETC coating is a combination of solubilized and discreet layers. According to some embodiments, the PFPE oil employed in the ETC coating can comprise a Solvay Fomblin® Z type oil, a Fomblin® Y type oil, a Fomblin® K type oil, Krytox™ K type oil from The Chemours Company, a Demnum™ type oil from Daikin Industries or other similar PFPE oil.

An example of a suitable easy-to-clean coating is described in U.S. patent application Ser. No. 13/690,904, entitled "PROCESS FOR MAKING OF GLASS ARTICLES WITH OPTICAL AND EASY-TO-CLEAN COATINGS," filed on Nov. 30, 2012, which is incorporated herein in its entirety by reference. The easy-to-clean coating may alternately or additionally comprise a low-friction coating or surface treatment. Exemplary low-friction coating materials may include silanes (e.g. fluorosilanes), phosphonates, alkenes, and alkynes. According to one or more embodiments, the ETC coating may comprise or consist essentially of fluorinated silanes, such as a perfluoropolyethersilane. For example, the ETC coating may comprise 50 wt. % or more, 60 wt. % or more, 70 wt. % or more, 80 wt. % or more, 90 wt. % or more, 95 wt. % or more, or even 99 wt. % or more of fluorinated silane.

Several example aspects of the present disclosure are included below. In a first aspect, an electronic device may comprise a display device operable to project an image, a front cover substrate positioned over the display device and comprising a transparent material, and a protective coating disposed on at least a portion of the non-display area of the front cover substrate. The front cover substrate may comprise a display area over the display device and a non-display area around at least the perimeter of the front cover substrate such that the display device is operable to project the image through the display area of the front cover substrate. The protective coating may comprise an inorganic material. The protective coating may not be positioned over the display area.

In a second aspect, a coated front cover substrate for an electronic device may comprise a display area and a non-display area around at least the perimeter of the front cover substrate such that an image may be viewed through the display area of the front cover substrate, and a protective coating disposed on at least a portion of the non-display area of the front cover substrate. The protective coating may comprise an inorganic material. The protective coating may not be positioned over the display area.

In a third aspect, a method for manufacturing an electronic device may comprise the steps of assembling a housing, one or more computer components, and a display device. The housing may comprise a front cover substrate that is positioned over the display device and comprises a transparent material. The front cover substrate may comprise a display area over the display device and a non-display area around at least the perimeter of the front cover substrate such that the display device is operable to project the image through the display area of the front cover substrate. A protective coating may be disposed on at least a portion of the non-display area of the front cover substrate, the protective coating comprising an inorganic material, wherein the protective coating is not positioned over the display area.

Another aspect includes any of the previous aspects, wherein the protective coating comprises one or more of $Si_uAl_vO_xN_y$, $Ta_2O_5$, $Nb_2O_5$, AlN, $Si_3N_4$, $AlO_xN_y$, $SiO_xN_y$, $SiN_x$, $SiN_x$:$H_y$, $HfO_2$, $TiO_2$, $ZrO_2$, $Y_2O_3$, $Al_2O_3$, $MoO_3$, TiC, TiB, TiBC, SiC, $Si_uO_xC$, diamond-like carbon, diamond film, or combinations thereof.

Another aspect includes any of the previous aspects, wherein the protective coating comprises a thickness of from ≥100 nm to ≤10 microns.

Another aspect includes any of the previous aspects, wherein the protective coating is disposed at the edges of the front cover substrate.

Another aspect includes any of the previous aspects, wherein the protective coating is disposed over substantially the entire non-display area.

Another aspect includes any of the previous aspects, wherein 50% or more of the front cover substrate does not include the protective coating.

Another aspect includes any of the previous aspects, further comprising a camera, wherein the front cover substrate comprise a camera area adjacent the camera, and wherein the non-display area is distinct from the camera area.

Another aspect includes any of the previous aspects, further comprising an opaque layer under at least a portion of the non-display area of the front cover substrate.

Another aspect includes any of the previous aspects, wherein the protective coating comprises an a* of greater than or equal to 2 or a b* of greater than or equal to 2 in transmittance when viewed at a normal angle of incidence according to L*a*b* color coordinates.

Another aspect includes any of the previous aspects, further comprising an ETC coating over at least a portion of the protective coating.

Another aspect includes any of the previous aspects, further comprising a back cover substrate comprising a non-display area, and a back protective coating disposed on the non-display area of the back cover substrate.

Another aspect includes any of the previous aspects, wherein the front cover substrate comprises glass.

Another aspect includes any of the previous aspects, wherein the front cover substrate comprises a thickness of from ≥100 microns to ≤5 mm.

Another aspect includes any of the previous aspects, wherein the electronic device is a smartphone or tablet computer.

As used herein, the singular forms "a," "an" and "the" include plural referents unless the context clearly dictates otherwise. Thus, for example, reference to a "component" includes aspects having two or more such components, unless the context clearly indicates otherwise.

Directional terms as used herein—for example up, down, right, left, front, back, top, bottom—are made only with reference to the figures as drawn and are not intended to imply absolute orientation.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Ranges can be expressed herein as from "about" one particular value, and/or to "about" another particular value. As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The invention claimed is:

1. An electronic device comprising:
    a display device operable to project an image;
    a front cover substrate positioned over the display device and comprising a transparent material, the front cover substrate comprising a display area over the display device and a non-display area around at least a perimeter of the front cover substrate such that the display device is operable to project the image through the display area of the front cover substrate; and
    a protective coating disposed on top of at least a portion of a front surface of the front cover substrate in the non-display area of the front cover substrate, the protective coating comprising an inorganic material, wherein the front surface is opposite the display device, and the display area is free of the protective coating.

2. The electronic device of claim 1, wherein the protective coating comprises one or more of $Si_uAl_vO_xN_y$, $Ta_2O_5$, $Nb_2O_5$, AlN, $Si_3N_4$, $AlO_xN_y$, $SiO_xN_y$, $SiN_x$, $SiN_x:H_y$, $HfO_2$, $TiO_2$, $ZrO_2$, $Y_2O_3$, $Al_2O_3$, $MoO_3$, TiC, TiB, TiBC, SiC, $Si_nO_xC$, diamond film, or combinations thereof.

3. The electronic device of claim 1, wherein the protective coating comprises a thickness of from ≥100 nm to ≤10 microns.

4. The electronic device of claim 1, wherein the protective coating is disposed at the edges of the front cover substrate.

5. The electronic device of claim 1, wherein the protective coating is disposed over substantially the entire non-display area.

6. The electronic device of claim 1, wherein 50% or less of the front cover substrate is free of the protective coating.

7. The electronic device of claim 1, further comprising a camera, wherein the front cover substrate comprise a camera area adjacent the camera, and wherein the non-display area is distinct from the camera area.

8. The electronic device of claim 1, further comprising an opaque layer under at least a portion of the non-display area of the front cover substrate.

9. The electronic device claim 1, wherein the protective coating comprises an a* of greater than or equal to 2 or a b* of greater than or equal to 2 in transmittance when viewed at a normal angle of incidence according to L*a*b* color coordinates.

10. The electronic device of claim 1, further comprising an ETC coating over at least a portion of the protective coating.

11. The electronic device of claim 1, further comprising a back cover substrate comprising a non-display area, and a back protective coating disposed on the non-display area of the back cover substrate.

12. The electronic device of claim 1, wherein the front cover substrate comprises glass.

13. The electronic device of claim 12, wherein the front cover substrate comprises a thickness of from ≥100 microns to ≤5 mm.

14. The electronic device of claim 1, wherein the electronic device is a smartphone or tablet computer.

* * * * *